United States Patent
Esken et al.

(10) Patent No.: US 12,015,144 B2
(45) Date of Patent: Jun. 18, 2024

(54) CORE-SHELL PARTICLES BASED ON RED LEAD FOR LEAD-ACID BATTERIES

(71) Applicant: Evonik Operations GmbH, Essen (DE)

(72) Inventors: Daniel Esken, Erlensee (DE); Michael Glagla, Kahl a. Main (DE); Rainer Bussar, Ohrdruf (DE); Micha Kirchgessner, Erfurt (DE); Ian Klein, Bad Harzburg (DE)

(73) Assignee: Evonik Operations GmbH, Essen (DE)

( * ) Notice: Subject to any disclaimer, the term of this patent is extended or adjusted under 35 U.S.C. 154(b) by 120 days.

(21) Appl. No.: 17/656,053

(22) Filed: Mar. 23, 2022

(65) Prior Publication Data
US 2022/0310987 A1    Sep. 29, 2022

(30) Foreign Application Priority Data
Mar. 24, 2021   (EP) .................... 21164480

(51) Int. Cl.
*H01M 4/14*    (2006.01)
*H01M 4/02*    (2006.01)
*H01M 4/21*    (2006.01)

(52) U.S. Cl.
CPC ............... *H01M 4/14* (2013.01); *H01M 4/21* (2013.01); *H01M 2004/021* (2013.01)

(58) Field of Classification Search
CPC ............ H01M 4/14; H01M 4/16; H01M 4/20; H01M 4/56; H01M 4/57; H01M 2004/021
See application file for complete search history.

(56) References Cited

U.S. PATENT DOCUMENTS

| 4,986,317 A | 1/1991 | Takahashi et al. |
| 5,252,105 A | 10/1993 | Witherspoon et al. |
| 7,759,009 B2 | 7/2010 | Hennige et al. |
| 2004/0151982 A1* | 8/2004 | Shivashankar ......... H01M 4/16 429/234 |
| 2020/0212434 A1* | 7/2020 | Shim .................... H01M 4/8882 |
| 2021/0328210 A1* | 10/2021 | Johnson .............. H01M 10/054 |

FOREIGN PATENT DOCUMENTS

| CN | 102931399 A | 2/2013 |
| CN | 105098176 A | 11/2015 |
| CN | 106876666 A | 6/2017 |
| CN | 107863521 A | 3/2018 |

(Continued)

OTHER PUBLICATIONS

U.S. Appl. No. 16/486,589, filed Aug. 16, 2019, 2020/0010367 A1, Esken, D, et al.

(Continued)

*Primary Examiner* — Christopher P Domone
*Assistant Examiner* — Jonathan William Estes
(74) *Attorney, Agent, or Firm* — Oblon, McClelland, Maier & Neustadt, L.L.P.

(57) ABSTRACT

Core-shell particles may be based on red lead coated with pyrogenically produced titanium dioxide and/or a pyrogenically produced aluminum oxide, and a process may prepare such core-shell particles which may be used in lead-acid batteries. The red lead may include $PbO_2$ in a range of from 25 to 32 wt. %.

18 Claims, 2 Drawing Sheets

(56) References Cited

FOREIGN PATENT DOCUMENTS

| CN | 108832095 A | * | 11/2018 |
|---|---|---|---|
| CN | 108832095 A | | 11/2018 |
| DE | 10 2019 135 155 A1 | | 6/2020 |
| EP | 1 083 151 A1 | | 3/2001 |
| EP | 1 697 260 B1 | | 7/2012 |
| JP | 50-115280 A | | 9/1975 |
| RU | 2 611 879 C2 | | 3/2017 |
| WO | WO 2004/059772 A2 | | 7/2004 |
| WO | WO2005/061385 A2 | | 7/2005 |
| WO | WO 2006/067127 A1 | | 6/2006 |

OTHER PUBLICATIONS

U.S. Appl. No. 17/274,185, filed Mar. 7, 2021, 2022/0052376 A1, Su, S, et al.
U.S. Appl. No. 17/608,557, filed Apr. 28, 2020, Huang, Y, et al.
U.S. Appl. No. 17/638,552, filed Feb. 25, 2022, Esken, D, et al.
U.S. Appl. No. 17/641,925, filed Mar. 10, 2022, Schaefer, D, et al.
U.S. Appl. No. 17/638,549, filed Feb. 25, 2022, Esken, D, et al.
U.S. Appl. No. 17/641,960, filed Mar. 10, 2022, Schaefer, D, et al.
U.S. Appl. No. 17/454,070, filed Nov. 9, 2021, Herzog, M, et al.
U.S. Appl. No. 17/693,763, filed Mar. 14, 2022, Ness, D, et al.
Extended European Search Report dated Sep. 17, 2021 in European Application 21164480.2 filed on Mar. 24, 2021, 8 pages (with Written Opinion).
"ISO 13320", ISO, 2009, 60 pages.
"DIN ISO 9277", DIN, Jan. 2014, 30 pages.
"DIN EN ISO 787-11", DIN, Oct. 1995, 6 pages.
"DIN ISO 15901-1", DIN, Mar. 2019, 27 pages.

* cited by examiner

CORE-SHELL PARTICLES BASED ON RED LEAD FOR LEAD-ACID BATTERIES

CROSS-REFERENCE TO RELATED APPLICATIONS

The present application claims the benefit of the filing date of European Appl. No. 21 164 480.2, filed on Mar. 24, 2021, the content of which is incorporated by reference.

The invention relates to core-shell particles based on red lead coated with fumed metal oxides, a process for preparation and use thereof in lead-acid batteries.

Conventional lead-acid batteries (LAB) contain a positive electrode, a charged active mass containing $PbO_2$, and a negative electrode, a charged active mass containing spongy Pb immersed in a diluted sulfuric acid electrolyte. The electrodes are electrically separated by, e.g., a leave or an envelope type separator, which ensures the transport of ions within the electrolyte. The porous separator material prevents any direct contact and, thus, electrical short circuits of the electrodes. Such electrodes are typically based on conductive grids and manufactured by applying a paste containing lead oxide(s) and lead sulfate(s) to the grids. After the pasting process, the pasted, so-called "green" plates need to undergo a curing process and, hereafter, a formation process.

Conventional pastes contain lead oxide, sulfuric acid, water, and additives such as fibers, and in case of the negative active mass, expander mixes. The positive paste can also contain red lead, a highly oxidized leady oxide, to ensure a faster and more efficient formation process. Positive pastes used for the positive active mass (PAM) are usually prepared by adding diluted sulfuric acid and water to a mixture of powdered lead and lead oxide(s). As a result of the chemical reaction during mixing, a portion of the leady oxides is initially converted to basic lead sulfates, and the resulting positive paste comprises a heterogeneous mixture of lead, leady oxide, and small amounts of lead sulfate.

One of the critical characteristics of a positive active mass is the so-called mass utilization. The latter indicates the percentage of the active mass material delivering the plate's electrical capacity. A plate capacity is depending on the discharge rates and the testing conditions. Therefore, reference capacities are used in the battery industry. For this work, we used the C5 capacity as a reference.

Since the electrolyte is involved in the charge and discharge reaction in the positive active mass, the active mass's relatively high porosity is required to allow the electrolyte penetration in the active mass's inner layer and achieve a high specific capacity. The porosity determined by water intrusion is one relevant parameter for accessing the electrolyte uptake of the active electrode mass. A porosity of at least 40% as determined by the water intrusion method is desirable for optimizing the active mass. Aside from the water intrusion, the intrusion with mercury is studied. The mercury intrusion allows studying the contribution of different pore diameters towards the total porosity.

Different approaches have been developed for increasing the porosity and capacity of lead-acid batteries.

Thus, various additives such as fibers, silica, or metal oxides can be added to pastes of LABs to improve their performance. Silica and metal oxides are usually used as the so-called expander or pore-forming additives aiming at increasing the accessible active surface area of the electrode paste, which can increase the overall capacity of the lead battery.

RU 2611879 C2 discloses the use of $TiO_2$ in rutile form as an expander for battery pastes comprising lead oxides. The method for producing such lead oxide pastes includes wet mixing of water, sulfuric acid, lead oxide, fibers, silica, titanium dioxide, and aluminum sulfate.

CN 107863521 A discloses the preparation of a paste for lead-acid battery by a wet mixing method comprising grinding of lead oxide and adding barium sulfate, lignin, titanium dioxide, humic acid, and an aqueous dispersion of carbon fibers, stirring the wet mixture for 10 to 12 minutes and adding sulfuric acid. The average particle size of lead oxide particles is 4 to 6 μm with a degree of oxidation of 75 to 78%. The nature of $TiO_2$ particles is not disclosed. $TiO_2$ particle size is reported to be in the range of 20 to 30 nm.

CN 102931399 A discloses cathode paste for lead-acid batteries comprising 70 to 75 wt % of lead, 2 to 6 wt % of aluminum oxide, 0.05 to 0.1 wt % of conductive fibers, 5-8 wt % of sulfuric acid, 9.1 to 0.6 wt % of antimony oxide, 0.005 to 0.01 wt % of silica, 0.005 to 0.01 wt % of magnesium sulfate, 0.005 to 0.01 wt % of potassium sulfate, lead oxide, and water. Neither the preparation method for this cathode paste nor its components' exact role is disclosed.

An additive containing a four-basic lead sulfate ($4PbO \times PbSO_4$, 4BS) with an average particle size of less than 3 μm and fine silica particles, described in WO 2004/059772 A2, facilitates the electrochemical formation of the lead electrode and leads to the production of, particularly powerful lead storage batteries.

Red lead ($Pb_3O_4$, also described with the formula $2PbO \times PbO_2$) may be added to the positive paste formulation, which improves the efficiency of formation and the structure of the positive active mass, leading to a substantial improvement of the performance of a lead battery in the initial characteristics, such as the initial capacity. Thus, U.S. Pat. Nos. 4,986,317 A and 5,252,105A describe preparation methods of electrodes for lead-acid batteries using red lead.

Additives used in the (positive and negative) battery pastes may impact the latter's viscosity. Battery pastes with relatively high density, but relatively low viscosity are beneficial for increasing the pasting process's production output. A stable paste viscosity allows furthermore increasing the process stability in terms of realizing a more stable pasting thickness over time. All these effects allow reducing the production costs of the lead-acid batteries. Using such pastes lead to increasing the maximal throughput of both continuous and discontinuous production lines by a faster and more homogeneous application thereof on the surface of the lead supporting elements such as lead grids.

Although lead-acid battery technology has been known for quite some time, there is further need for developing new ways of increasing the overall performance, particularly the capacity of such batteries, and reduce production costs thereof. New additives for use in lead-acid batteries, which can be used in various types of currently applied LABs without changing the established manufacturing practices and improving the performance thereof, are required.

The used additive should not hinder the formation of the four-basic lead sulfate crystals (4BS) during the curing of the plates. The cured active mass's pore structure should not be deteriorated by using the additive. Optimally, the used additive should increase the total porosity and the ratio of pores with a diameter of about 1 μm. This structural change facilitates a rapid formation of the active mass. Increasing the active mass's porosity usually leads to an increased specific capacity of the electrode plate per weight of the active mass.

Another technical problem addressed by the invention is providing additives reducing the electrode pastes' viscosity with high density.

The object of the present invention is a core-shell particle, comprising a core containing red lead and a shell containing a pyrogenically produced titanium dioxide and/or a pyrogenically produced aluminum oxide.

The inventors unexpectedly found that such core-shell particles used as additives in lead-acid batteries led to increased utilization of the positive active mass and lower and more stable viscosity of the active mass pasting and the plate manufacturing process.

Red Lead

The term "red lead" refers in the context of the present invention to a class of leady oxides higher oxidized than PbO. For practical reasons, the red lead compounds are typically characterized by the so-called nominal $PbO_2$ content. However, red lead is not a mixture of PbO and $PbO_2$, and the nominal $PbO_2$ content is providing the oxidation equivalent. In the context of the invention, it is preferable that the red lead contains a minimum of 25% and up to 32% of $PbO_2$ by weight. Thus, the red lead in the inventive particle preferably contains 25% to 32% by weight of $PbO_2$. It has been found that mixing pure $PbO_2$ (which is not a semiconductor) with pure PbO can lead to some disadvantages.

The number average particle size $d_{50}$ of the red lead is of critical importance, and is preferably not more than 5 μm, more preferably less than 3 μm, more preferably in the range from about 1 μm to 3 μm being especially advantageous. It is especially favorable when the number average particle size $d_{50}$ of the red lead is between about 1 μm and 3 μm. The number average particle size $d_{50}$ can be determined according to ISO 13320:2009 by laser diffraction particle size analysis.

Red lead contained in the inventive core-shell particle preferably has a specific BET surface area of not more than about 1.5 $m^2/g$, especially of not more than about 1.3 $m^2/g$, more preferably between about 1.3 $m^2/g$ and 0.9 $m^2/g$, and especially between about 1.3 $m^2/g$ and 0.5 $m^2/g$. The BET surface area can be determined according to DIN 9277:2014-01 by nitrogen adsorption according to the Brunauer-Emmett-Teller procedure.

Titanium Dioxide and Aluminum Oxide

The inventive core-shell particle comprises a shell containing a pyrogenically produced titanium dioxide and/or a pyrogenically produced aluminum oxide.

The term "pyrogenically produced" means in the context of the present invention that the oxides are prepared by pyrogenic methods, also known as "fumed" methods. Thus, the terms "pyrogenically produced" and "fumed" are used as interchangeable equivalents.

Such "pyrogenic" or "fumed" processes involve the reaction of the corresponding metal precursors in flame hydrolysis or flame oxidation in an oxyhydrogen flame to form metal oxides. This reaction initially forms highly disperse approximately spherical primary metal oxide particles, which in the further course of the reaction coalesce to form aggregates. The aggregates can then accumulate into agglomerates. In contrast to the agglomerates, which as a rule can be separated into the aggregates relatively easily by the introduction of energy, the aggregates are broken down further, if at all, only by intensive introduction of energy. Said metal oxide powder might be partially destructed and converted into the nanometre (nm) range particles advantageous for the present invention by suitable grinding.

For instance, the preparation of fumed titanium dioxides is further described in EP 1697260 A1.

The preparation of pyrogenic aluminum oxides is further described, e.g. in EP 1083151 A1, WO 2006067127 A1, WO2005061385 A2.

The pyrogenically, especially flame-hydrolytically produced titanium dioxide and aluminum oxide powders, can be produced starting from titanium or aluminum halides, preferably $TiCl_4$ or $AlCl_3$. Such metal halides or other metal precursors can be evaporated, and the resulting vapor is mixed alone or together with a carrier gas, e.g., nitrogen, in a mixing unit in a burner with other gases, i.e., air, oxygen, nitrogen, and hydrogen. The gases are caused to react with each other in a flame in a closed combustion chamber to produce the corresponding metal oxide and waste gases. Then the hot waste gases and the metal oxide are cooled off in a heat-exchanger unit, the waste gases are separated from the metal oxide, and any halide remnants adhering to the metal oxide obtained are removed by heat treatment with moistened air.

The flame spray pyrolysis (FSP) process suitable for preparing fumed titanium dioxide or aluminum oxide may comprise the following steps:
1) a solution containing a metal precursor is atomized, e.g. by means of air or an inert gas, preferably using a multi-substance nozzle, and
2) mixed with a combustion gas, preferably hydrogen and/or methane, and air and
3) the mixture is allowed to burn in a flame into a reaction chamber surrounded by a casing,
4) the hot gases and the solid products are cooled, and then the solid product is removed from the gases.

Pyrogenically produced titanium dioxide, and aluminum oxide are in the form of aggregated primary particles, preferably with a numerical mean diameter of primary particles $d_{50}$ of 5 to 100 nm, more preferably 10 to 90 nm, even more preferably 20-80 nm, as determined by transition electron microscopy (TEM). This numerical mean diameter $d_{50}$ can be determined by calculating the average size of at least 500 particles analysed by TEM.

The mean diameter $d_{50}$ of the aggregates of the pyrogenically produced titanium dioxide and the pyrogenically produced aluminum oxide, employed in the production of the inventive core-shell particles, is usually about 10 nm to 1000 nm, the mean diameter $d_{50}$ of the agglomerates is usually 1 μm to 2 μm. These mean numerical values $d_{50}$ can be determined in a suitable dispersion, e.g., in aqueous dispersion, by static light scattering (SLS) method. The agglomerates and partly the aggregates can be destroyed e.g., by grinding or ultrasonic treatment of the particles to result in particles with smaller particle size.

Agglomerate and aggregate particle size of the fumed metal oxides can also be reduced during the formation of the core-shell particles.

According to the invention, the number average aggregate particle size $d_{50}$ of the titanium dioxide and/or the aluminum oxide in the core-shell particle is preferably 10 nm to 150 nm, more preferably 20 nm to 130 nm even more preferably 30 to 120 nm, as determined by TEM analysis.

The pyrogenically produced titanium dioxide and a relatively narrow particle size distribution preferably characterizes the pyrogenically produced aluminum oxide present in the inventive core-shell particle. This helps to achieve a high-quality metal oxide layer on the surface of red lead.

The narrowness of the particle size distribution of these metal oxides can be characterized by the value of span= $(d_{90}-d_{10})/d_{50}$.

The span $(d_{90}-d_{10})/d_{50}$ of particles of the titanium dioxide and/or aluminum oxide is preferably 0.4 to 1.2, more preferably 0.5 to 1.1, even more preferably 0.6 to 1.0, as determined by static light scattering (SLS) after 60 s of ultrasonic treatment at 25° C. of a mixture consisting of 5% by weight of the particles and 95% by weight of a 0.5 g/L solution of sodium pyrophosphate in water.

The d values $d_{10}$, $d_{50}$, and $d_{90}$ are commonly used for characterizing the cumulative particle diameter distribution of a given sample. For example, the $d_{10}$ diameter is the diameter at which 10% of a sample's volume is comprised of smaller than $d_{10}$ particles, the $d_{50}$ is the diameter at which 50% of a sample's volume is comprised of smaller than $d_{50}$ particles. The $d_{50}$ is also known as the "volume median diameter" as it divides the sample equally by volume; the $d_{90}$ is the diameter at which 90% of a sample's volume is comprised of smaller than $d_{90}$ particles.

The pyrogenically produced titanium dioxide and aluminum oxide are preferably hydrophilic in nature, i.e. these are not further treated by any hydrophobic reagents, such as silanes, after their synthesis by a pyrogenic process. Thus, the particles usually have a purity of at least 96% by weight, preferably at least 98% by weight, more preferably at least 99% by weight. The sum of the proportions of all other than Al or Ti metals of these elements is preferably less than 500 ppm, more preferably less than 100 ppm. The content of chloride is preferably less than 0.5% by weight, more preferably 0.01 to 0.3% by weight, based on the mass of the metal oxide powder. The proportion of carbon is preferably less than 0.2% by weight, more preferably 0.005% to 0.2% by weight, even more preferably 0.01% to 0.1% by weight, based on the mass of the metal oxide powder.

The BET surface area of the titanium dioxide and/or the aluminum oxide in the inventive core-shell particle is preferably 5 m$^2$/g to 200 m$^2$/g, more preferably 20 m$^2$/g to 160 m$^2$/g, more preferably 30 m$^2$/g to 140 m$^2$/g. Particularly preferably, the BET surface area of the fumed aluminum oxide is in the range of 60 m$^2$/g to 140 m$^2$/g, and the BET surface area of the titanium dioxide is in the range of 30 m$^2$/g to 80 m$^2$/g. The BET surface area can be determined according to DIN 9277:2014-01 by nitrogen adsorption according to the Brunauer-Emmett-Teller procedure.

Suitable fumed aluminum oxides are e.g. those available under the trade names Aeroxide® Alu 130, Aeroxide® Alu C, Aeroxide® Alu 65 and manufactured by Evonik Industries AG or SpectrAl® 100, SpectrAl® 51, SpectrAl® 81, SpectrAl® PC401 manufactured by Cabot Corporation.

Suitable fumed titanium dioxide is e.g. that available under the trade name Aeroxide® TiO$_2$ P25 and manufactured by Evonik Industries AG.

Core-Shell Particle

Core-shell particle, according to the invention, comprises a core containing red lead and a shell containing a pyrogenically produced titanium dioxide and/or a pyrogenically produced aluminum oxide.

The content of the fumed titanium dioxide and/or the aluminum oxide in the core-shell particle is preferably 0.1% to 10%, more preferably 0.5% to 8%, even more preferably 1.0% to 6%, even more preferably 2.0% to 5.0% by total weight of the core-shell particle.

The inventive core-shell particle preferably further comprises tetrabasic lead sulfate (4PbO×PbSO$_4$).

The presence of the tetrabasic lead sulfate in the core-shell particle of the invention allows the formation of tetrabasic lead sulfate crystals with a defined size during the curing of the electrode pasted electrodes, which is beneficial for achieving increased capacity and lifetime of the lead-acid batteries. The use of this additive is further disclosed e.g. in WO 2004/059772 A2.

Using tetrabasic lead sulfate crystals as an additive was found to lead to active masses with narrower pore size distribution and a high proportion of pores between about 1 µm and 2 µm. Such a narrow pore size distribution with a high proportion of pores between about 1 µm and 2 µm is advantageous for optimal electrode/electrolyte interaction.

The amount of tetrabasic lead sulfate in the core-shell particle can be 0.1% to 10%, more preferably 1.0% to 8%, more preferably 2.0% to 6% by weight of the particle.

The mean particle size of the used tetrabasic lead sulfate is preferably less than about 1.5 µm. The range from about 0.2 to 0.9 µm is found to be especially advantageous. A value below 0.2 µm would not bring any economic advantage. With increasing mean particle size, the amount of additive has to be increased, so the upper value's exceedance should be avoided here for economic reasons.

Tetrabasic lead sulfate is preferably wet-ground in an aqueous medium, especially in demineralized water, the grinding being continued until the mean particle size of the tetrabasic lead sulfate is less than about 3 µm.

Tetrabasic lead sulfate (4BS) can be mixed with red lead before coating the resulting mixture with fumed titanium dioxide and/or fumed aluminum oxide. Preparation of such red lead particles modified with 4BS can be carried out in a dry or wet mixing process. A dispersion of 4BS in water can be mixed with red lead to evenly distribute tetrabasic lead sulfate in red lead particles in a wet process.

The tamped density of the inventive core-shell particle is usually lower than that of the used red lead. This reflects the unique surface structure of the core-shell particles.

The core-shell particle, according to the invention, preferably has a tamped density of less than 3.3 g/cm$^3$, more preferably not more than 3.1 g/cm$^3$, more preferably 2.2 g/cm$^3$-3.1 g/cm$^3$, more preferably 2.3 g/cm$^3$ to 3.0 g/cm$^3$, more preferably 2.4 g/cm$^3$ to 2.9 g/cm$^3$, more preferably 2.5 g/cm$^3$ to 2.8 g/cm$^3$.

Tamped densities (also referred to as "tapped density") of various pulverulent or coarse-grain granular materials can be determined according to DIN EN ISO 787-11:1995 "General methods of test for pigments and extenders—Part 11: Determination of tamped volume and apparent density after tamping". This involves measuring the apparent density of a bed after agitation and tamping.

Process for Producing the Core-Shell Particle

The invention further provides a process for producing the core-shell particle according to the invention, wherein red lead and a pyrogenically produced titanium dioxide and/or aluminum oxide are subjected to dry mixing.

Dry mixing is understood to mean that essentially no liquid is added or used during the mixing process, that is e.g., substantially dry powders are mixed together. However, it is possible that there are trace amounts of moisture or some other than water liquids present in the mixed feedstocks or that these include crystallization water. Preferably, the mixture of the red lead and the pyrogenically produced metal oxide contains less than 5% by weight, more preferably less than 3% by weight, more preferably less than 1% by weight water and/or other liquids.

The dry mixing process of the present invention has some important benefits over a mixing process involving wet mixing, e.g., using a dispersion containing metal oxides. Such a wet mixing process inevitably involves the use of solvents, which must be evaporated after the mixing process is completed. Thus, the dry mixing process of the invention is simpler and more economical than the wet mixing process. On the other hand, it was surprisingly found that the dry mixing process of the invention also provides a better distribution of the pyrogenically produced metal oxide particles on the surface of the red lead.

Dry mixing is preferably conducted in the inventive process by means of an electric mixing unit at a specific electrical power of 0.02 kW to 2.0 kW, more preferably 0.05 kW to 1.5 kW, more preferably 0.1 kW to 1.0 kW, more preferably 0.15 kW to 0.6 kW per kg of the red lead.

The term "electric mixing unit" relates in the context of the present invention to any mixing device operated by means of electric energy.

Electrical power is the rate, per unit time, at which electrical energy is transferred by an electric circuit. The term "specific electrical power" relates in the context of the present invention to the electrical power supplied by the electrical mixing unit during the mixing process per kg of the red lead.

If the applied specific electrical power is less than 0.02 kW per kg of the red lead, this gives an inhomogeneous distribution of the pyrogenically produced metal oxide, which may not be firmly bonded to the core material (red lead) of the inventive core-shell particle.

A specific electrical power of more than 2.0 kW per kg of the red lead leads to higher energy consumption during the mixing process. In addition, there is a risk of destroying the target core-shell particles by too intensive mixing.

The nominal electrical power of the mixing unit can vary in a wide range, e.g., from 0.1 kW to 1000 kW. Thus, it is possible to use mixing units on the laboratory scale with a nominal power of 0.1 to 5 kW or mixing units for the production scale with a nominal electrical power of 10 to 1000 kW. The nominal electrical power is the nameplate, maximal absolute electrical power of the mixing unit.

It is likewise possible to vary the volume of the mixing unit in a wide range, e.g., from 0.1 L to 2.5 m$^3$. Thus, it is possible to use mixing units on the laboratory scale with a volume of 0.1 to 10 L or mixing units for the production scale with a volume of 0.1 to 2.5 m$^3$.

The term "volume of the mixing unit" refers in the context of the present invention to the maximal volume of the chamber of the electric mixing unit where the substances to be mixed can be placed.

Preferably, in the process, according to the invention, forced mixers are used in the form of intensive mixers with high-speed mixing tools. It has been found that the speed of the mixing tool of 5 to 30 m/s, more preferably 10 to 25 m/s, gives the best results. The term "mixing tool" refers in the context of the present invention to any object in the mixing unit, which can be moved, e.g. rotated, shaken, etc., and thus mixes the contents of the mixing unit. Examples of such mixing tools are stirrer of various forms. Commercially available mixing units well suited for the invention process are, for example, Henschel mixers or Eirich mixers.

The duration of the inventive mixing process is preferably 0.1 to 120 minutes, more preferably 0.2 to 60 minutes, very preferably 0.5 to 20 minutes.

The mixing may be followed by thermal treatment of the resulting core-shell particles. Such treatment may improve the binding of the pyrogenically produced metal oxides to the red lead particles. However, this treatment is not necessary for the process according to the invention since, in this process, the pyrogenically produced metal oxides adhere with sufficient firmness to the red lead particles. A preferred embodiment of the process according to the invention, therefore, does not comprise any thermal treatment after the mixing.

Lead Battery Components Comprising the Core-Shell Particle

The present invention further provides paste composition for lead-acid battery comprising the inventive core-shell particle.

The term "paste composition" in the context of the present invention is equivalent to the term "positive active mass" or "PAM".

Apart from the core-shell particle, the paste composition usually comprises lead (II) oxide PbO, sulfuric acid $H_2SO_4$, water, and other additives, such as shortcut fibers, fumed silica.

The amount of the inventive core-shell particles in the paste composition is preferably 5% to 40% by weight, more preferably 10% to 35% by weight, more preferably 15% to 30% by weight. The amount of PbO in the paste composition is preferably 30% to 90% by weight, more preferably 40% to 80% by weight, more preferably 50% to 70% by weight. Sulfuric acid (98% $H_2SO_4$) may comprise 2% to 20% by weight, more preferably 3% to 17% by weight, more preferably 5% to 15% by weight of the paste composition. The total amount of other additives, such as shortcut fibres or fumed silica, may comprise up to 5% by weight. The amount of water in the paste composition may be up to 25% by weight, more preferably not more than 20% by weight, even more preferably not more than 15% by weight.

The inventive paste composition has an increased porosity compared to the conventional paste compositions for LABs.

Two methods can adequately measure the porosity of the paste composition: water intrusion method according to a test method PM 600 defined by PENOX (PM 600, dated 13 Apr. 2018, the latter is following the test procedures by the battery industry) and mercury intrusion method according to DIN ISO 15901-1:2019.

The porosity of the inventive paste composition, as determined by mercury intrusion method according to DIN ISO 15901-1:2019, is preferably less than 0.20 cm$^3$/g, more preferably 0.10 cm$^3$/g to 0.18 cm$^3$/g, more preferably 0.11 cm$^3$/g to 0.15 cm$^3$/g, more preferably 0.12 cm$^3$/g to 0.14 cm$^3$/g.

The average pore diameter of the inventive paste composition, as determined mercury intrusion method according to DIN ISO 15901-1:2019, is preferably less than 10 μm, preferably 0.5 μm to 8 μm, more preferably 0.8 μm to 6 μm, more preferably 0.9 μm to 4.0 μm, more preferably 1.0 μm to 2.0 μm.

The porosity of the inventive paste composition determined by water intrusion method according to PENOX procedure PM 600 is preferably more than 40%, more preferably 40% to 60%, more preferably 40% to 50%.

The water porosity is preferentially close to the total porosity of the cured active mass. The latter is measured by the mercury intrusion method.

The inventive paste composition may be used for coating a lead electrode, e.g., a lead grid that serves as a current conductor in the lead-acid battery. In the curing phase, the coated electrode is usually exposed to gentle heat in a high humidity environment. The curing process causes the paste to change to a mixture of lead sulfate, which adheres to the lead electrode. Then, during the initial charge (called "formation") of the battery, the cured paste on the electrode is converted into electrochemically active material (the "active mass").

The invention further provides electrodes for lead-acid batteries comprising the inventive core-shell particle. The inventive electrode may be present in any suitable form, such as a flat plate electrode or a tubular plate electrode.

The invention further provides lead-acid batteries comprising the core-shell particle, according to the invention.

The inventive core-shell particle is preferably present in the electrodes of the lead-acid battery. Such electrodes are usually separated from each other by suitable separators, e.g. made of perforated polyvinyl chloride. The electrolyte of such lead-acid battery usually contains diluted sulfuric acid with a density of 1.25 up to 1.29 g/cm$^3$ in the fully charged state.

The invention also provides the use of the inventive core-shell particle in a lead-acid battery, particularly in the electrode of the lead-acid battery.

It is preferable that the core-shell particle, according to the invention, is used as an additive in the positive active composition and is added before the curing and drying of the individualized and non-individualized plates in the production of lead accumulators. Especially advantageously, the curing of the plates is effected in stacks, horizontally, vertically, or suspended, under the action of steam at a temperature of about more than 60° C., especially at a temperature of about 70 to 85° C., within about 1 to 2 hours. Good results are also achieved when the curing of the plates is performed in stacks, horizontally, vertically, or suspended, in batch chambers, or under the action of steam at temperatures below about 70° C. and within 12 to 24 hours.

The plates can also be cured in a continuous curing and drying operation. Especially good results are achieved when the curing of the plates is performed in stacks, horizontally, vertically, or suspended, in a continuous curing and drying operation under the action of steam at about 70 to 85° C. within about 1 hour. In the continuous curing and drying operation described, it is especially preferable that the curing and drying are affected in a multi-stage drying at rising temperatures. It has been found to be especially advantageous that the drying at rising temperatures commences at about 50° C. and is performed rising to about 85° C., over about 1 to 4 hours, especially over about 2 to 3 hours. The inventive core-shell particle can be applied in all types of current lead-acid battery plant technology and routine process operations. Current pasting lines with the downstream stack systems and all standard curing and drying chambers can be used without modification.

The advantages of the inventive core-shell particle additive are mainly that the cured lead plates enable better charge acceptance and exhibit a higher mass utilization. The formation process is more energy-efficient since the overcharging energy (the latter means additional energy needed to charge a cured active mass fully) is reduced by realizing a lower over-voltage. Depending on the additional porosity and the BET surface of the cured active mass, the formation time can be reduced as well, and thus, the overcharging is further reduced.

Additionally, the use of the inventive core-shell particle reduces the viscosity of the high-density electrode pastes and thus facilitates the mixing process and further handling of the pastes. Thus, such high-density electrode pastes can be distributed faster and more evenly on electrode grids. The latter allows increasing the throughput of production lines and producing qualitatively better electrodes for lead-acid batteries.

EXAMPLES

Figure 1:
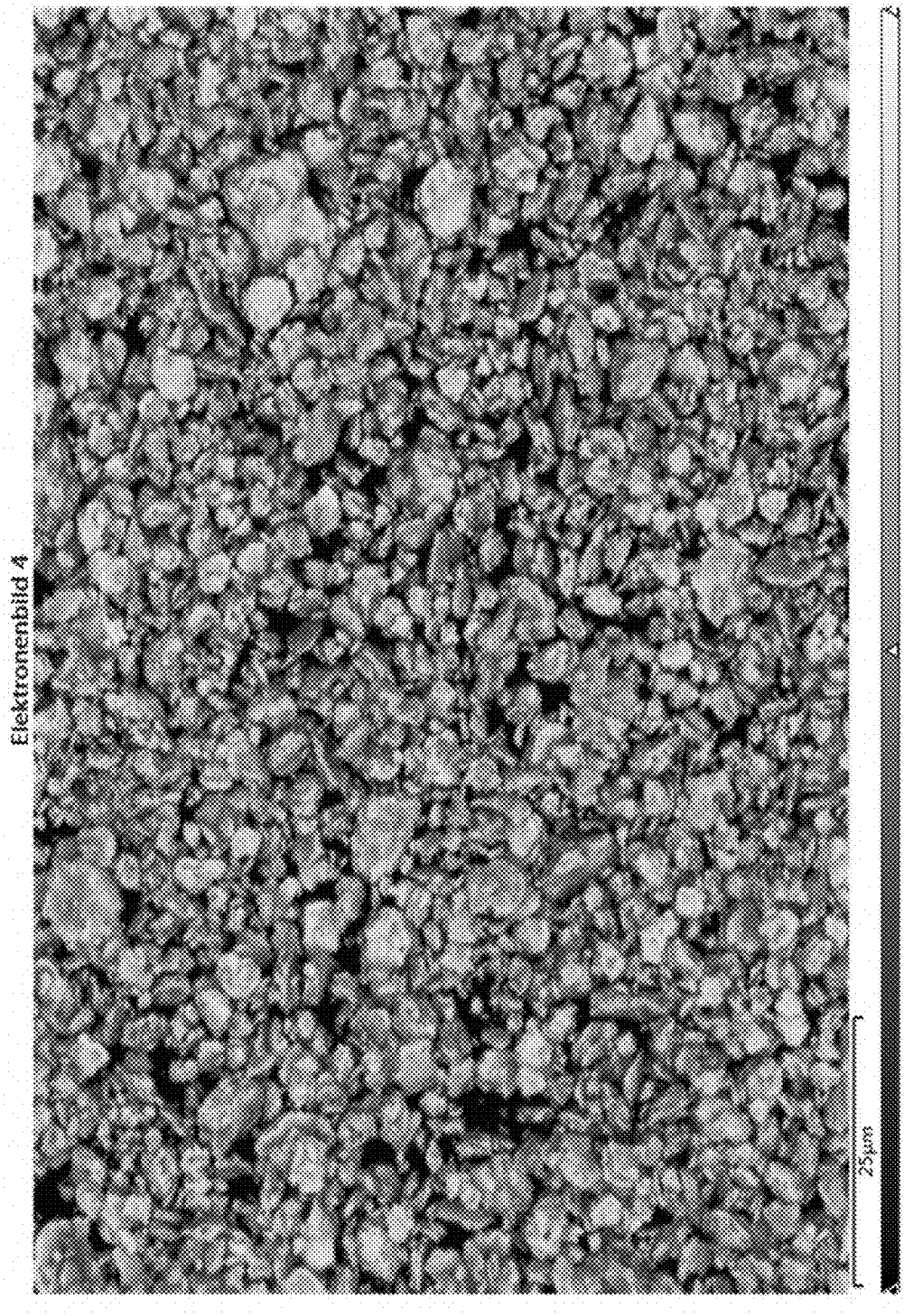
FIG. 1 shows an SEM image of the inventive core-shell particles prepared according to example 2.
Figure 2:
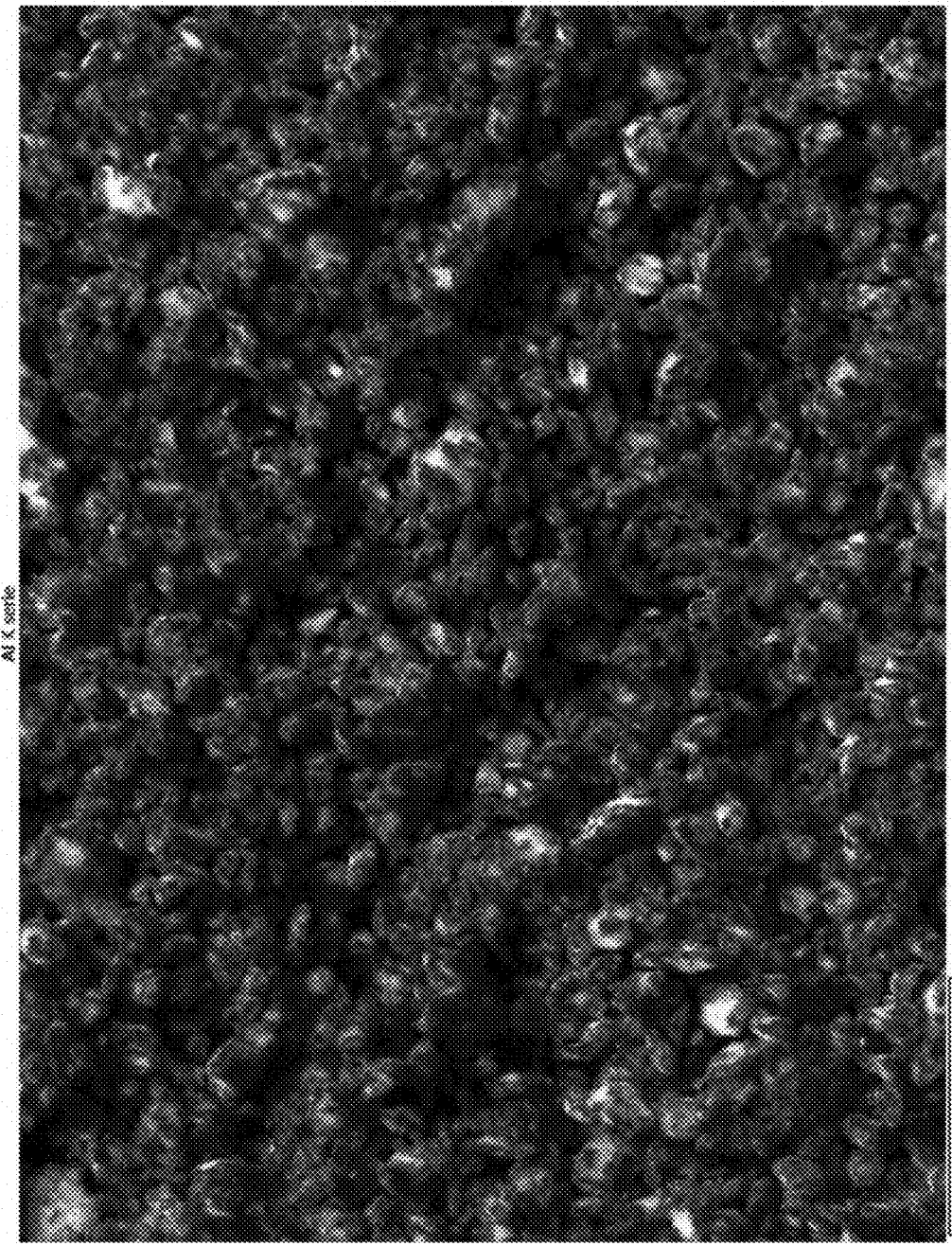
FIG. 2 shows an image of SEM-EDX mapping of Al atoms (white) in fumed $Al_2O_3$ coated on red lead (example 2).

Preparation of Red Lead Powder Modified with 5 wt. % of Four-Basic Sulfate

The preparation of red lead modified with tetrabasic lead sulfate seeds is described in DE102019135155A1.

Preparation of Core-Shell Particles

Example 1

3 kg of red lead powder modified with 5 wt. % of tetrabasic sulfate, having a $d_{50}$ of about 3 μm and a tamped density of 3.3 g/cm$^3$ were mixed with the corresponding quantity (4 wt. % relative to the mass of red lead) of the fumed aluminum oxide Aeroxide® Alu 130 powder (manufacturer Evonik Industries AG) in a laboratory mixer Eirich R01 with a three-stage star-type agitator at a rotation speed of 500 rpm (mixing power 0.125 kW). The obtained orange-red mixture is optically much more flowable than the starting materials. The tamped density of the resulting product was about 2.8 g/cm$^3$.

Example 2

The procedure was identical as in example 1, except non-modified red lead (manufactured by PENOX) was used, the rotation speed was 4000 rpm, and the rotation time was 10 minutes.

Example 3

The procedure was identical as in example 1, except for rotation speed and time, which were 4000 rpm (mixing power 1 kW), and 10 minutes, respectively.

Comparative Example 1

Lead oxide (PbO) without the addition of red lead was used to prepare the positive active mass (see below).

Comparative Example 2

Unmodified red lead was used to prepare the positive active mass (see below).

Preparation of the Positive Active Mass (PAM): A General Procedure.

2036.8 g of lead oxide (PbO, 100%) (comparative example 1) or the mixture of lead oxide (PbO, 75 wt %) and modified or unmodified red lead ($Pb_3O_4$, 25 wt %) (all other examples) was used. The shortcut fibers (5.1 g) were fed in, and the components are then premixed dry at a rotation speed of 500 rpm using the countercurrent principle. In this case, the dry mix of all dry components is typically more homogenous if the mixing vessel/pan is rotating in a counter direction to the rotor tool's stirring blades (countercurrent principle). The deionized water (229.1 g) was then added while constantly stirring the materials at a constant speed of 500 rpm. The addition was finished after 1.5 minutes. Diluted sulfuric acid (229.1 g, d=1.40 g/mL) was added over ca. 2 minutes while the temperature of the paste mixture rose from about 25 C up to 50° C. The paste was stirred for 2 minutes and then actively cooled until the temperature has dropped to below 45° C.

Production and Curing of Positive Plates

The positive plates were prepared by manual pasting of the positive mass onto gravity-casted grids. According to a defined curing program, the prepared positive plates were cured in a climatic cabinet. In this work, all plates have been cured to a tetrabasic structure.

During the curing, the active mass undergoes several steps. Initially, at high temperatures (85° C.) and two hours duration, the crystal growth is facilitated. Afterwards, the humidity in the chamber is reduced to about 70% to allow the free lead within the active mass to be oxidized to lead oxide. Depending on the thickness of the positive plates the oxidation process can take up to 6 hours. Hereafter, the plates were dried until the target residual moisture content of less than one percent by weight was achieved.

The cured plates' porosity was determined by the water intrusion method and in addition by the high-pressure mercury intrusion method. The latter is using an AutoPore IV 9500 2.03.00.

The cured plates need to undergo a formation process before the electrical testing. The formation step has a significant impact on transforming the cured active mass structure into the formed active mass structure. Therefore, the formation parameters had been kept constant.

Electrical Tests with the Positive Plates

Positive plates with a nominal capacity of 2.5 Ah (C5) were tested in the series of measurements performed. The cells consisted of a positive plate, the test sample, and two negative plates. The capacity was determined with an electrolyte density of 1.28 g/cm$^3$ (+/−0.05 g/cm$^3$) at 25° C. The plates' final discharge voltage was set at 1.70V for the five-hour capacity tests, and 0.5 A was used as the discharge current. The test temperature was kept constant at 25° C. by a water bath.

The aim was to increase the capacity of the positive active mass in the first cycles through the used additive materials. Furthermore, the target was to reach the constant working capacity as quickly as possible. For this purpose, the achieved capacity (in Ah) related to the used active mass (in g) was measured (in Ah/g) in the first charge/discharge cycles.

Table 1 shows the results of charging/discharging tests with LAB pastes containing PbO without the addition of $Pb_3O_4$ (comparative example 1).

TABLE 1

Charging/discharging tests with LAB pastes containing PbO without $Pb_3O_4$ (comparative example 1).

| Test | cured PAM*, g | C5 #1**, Ah | C5 #2**, Ah | C5 #3**, Ah | C5 average (#1 to #3**), Ah | Mass utilization*** (#3), g/Ah |
|---|---|---|---|---|---|---|
| 1 | 25.943 | 2.57 | 2.89 | 3.02 | 2.83 | 8.59 |
| 2 | 25.914 | 0.69 | 2.60 | 3.00 | 2.10 | 8.64 |
| 3 | 25.917 | 2.54 | 2.90 | 3.03 | 2.82 | 8.55 |
| average | | | | | | 8.59 | here and in other tables:
*PAM = positive active mass
**C 5#1-#3: number of charging cycles
***Mass utilization (#3) = PAM mass/C5#3.

Table 2 shows the results of charging/discharging tests with LAB pastes containing 25 wt % $Pb_3O_4$ (comparative example 2).

TABLE 2

Charging/discharging tests with a paste containing 25 wt % $Pb_3O_4$ (comparative example 2).

| Test | cured PAM*, g | C5 #1**, Ah | C5 #2**, Ah | C5 #3**, Ah | C5 average (#1 to #3**), Ah | Mass utilization*** (#3), g/Ah |
|---|---|---|---|---|---|---|
| 1 | 25.522 | 2.18 | 2.98 | 3.17 | 2.78 | 8.06 |
| 2 | 25.548 | 2.14 | 2.65 | 2.98 | 2.59 | 8.57 |
| average | | | | | | 8.31 |

Table 3 shows the results of charging/discharging tests with LAB pastes containing 25 wt % $Pb_3O_4$ coated with 4 wt. % fumed $Al_2O_3$ at 4000 rpm (example 1).

TABLE 3

Charging/discharging tests with LAB pastes containing 25 wt % $Pb_3O_4$ coated with 4 wt. % fumed $Al_2O_3$ at 4000 rpm (example 1).

| Test | cured PAM*, g | C5 #1**, Ah | C5 #2**, Ah | C5 #3**, Ah | C5 average (#1 to #3**), Ah | Mass utilization*** (#3), g/Ah |
|---|---|---|---|---|---|---|
| 1 | 25.116 | 2.70 | 3.18 | 3.36 | 3.08 | 7.47 |
| 2 | 25.363 | 2.65 | 3.35 | 3.50 | 3.17 | 7.25 |
| 3 | 25.547 | 2.62 | 3.10 | 3.41 | 3.05 | 7.49 |
| 4 | 25.289 | 2.01 | 3.04 | 3.29 | 2.78 | 7.69 |
| average | | | | | | 7.48 |

Table 4 shows the results of charging/discharging tests with LAB pastes containing 25 wt % ($Pb_3O_4$+5 wt % $4PbO \times PbSO_4$) mix coated with 4 wt % fumed $Al_2O_3$ at 4000 rpm (example 2).

TABLE 4

Charging/discharging tests with LAB pastes containing 25 wt % ($Pb_3O_4$ + 5 wt % $4PbO \times PbSO_4$) mix coated with 4 wt % fumed $Al_2O_3$ at 4000 rpm (example 2).

| Test | cured PAM*, g | C5 #1**, Ah | C5 #2**, Ah | C5 #3**, Ah | C5 average (#1 to #3**), Ah | Mass utilization*** (#3), g/Ah |
|---|---|---|---|---|---|---|
| 1 | 25.454 | 2.59 | 3.73 | 3.59 | 3.30 | 7.09 |
| 2 | 25.510 | 2.85 | 3.62 | 3.45 | 3.31 | 7.39 |
| 3 | 25.327 | 1.27 | 3.32 | 3.46 | 2.68 | 7.32 |
| 4 | 25.218 | 3.15 | 3.27 | 3.18 | 3.20 | 7.93 |
| average | | | | | | 7.43 |

Table 5 shows the results of charging/discharging tests with LAB pastes containing 25 wt % ($Pb_3O_4$+5 wt % $4PbO \times PbSO_4$) mix coated with 4 wt. % fumed $Al_2O_3$ at 500 rpm (example 3).

TABLE 5

Charging/discharging tests with pastes containing 25 wt % ($Pb_3O_4$ + 5 wt % $4PbO \times PbSO_4$) mix coated with 4 wt. % fumed $Al_2O_3$ at 500 rpm (example 3).

| Test | cured PAM*, g | C5 #1**, Ah | C5 #2**, Ah | C5 #3**, Ah | C5 average (#1 to #3**), Ah | Mass utilization*** (#3), g/Ah |
|---|---|---|---|---|---|---|
| 1 | 25.531 | 3.26 | 3.28 | 3.19 | 3.24 | 8.0 |
| 2 | 25.475 | 3.29 | 3.34 | 3.25 | 3.29 | 7.8 |
| average | | | | | | 7.9 |

Table 6 summarizes the results of comparative examples 1-2 and examples 1-3 shown in Tables 1-5.

Table 6 provides an overview of the positive active masses (PAM), which had been studied and characterized in terms of the structural parameters and the related specific capacity, expressed as a mass utilization. The latter is the mass of PAM needed per Ampere hour (Ah) of capacity measured as C5 capacity (at 25° C. and a discharge to 1.70V per cell). The addition of pyrogenic oxides impacts the structure of the cured electrodes and results in better mass utilization, i.e., decreasing the PAM weight needed per Ah.

One driver for better mass utilization is increased porosity measured as water intrusion. Nevertheless, a simple porosity model does not give a complete explanation since the pores' diameter, and the pore size distribution is also changed by the use of additives. Therefore, table 6 also provides the mercury intrusion, which indicates the buoyance of the pores. Average mass utilization of PAMs in examples 1-3 is lower than in comparative examples 1-2, suggesting that using core-shell particles allows more efficient utilization of the active electrode mass. This effect is more pronounced when the formation of the core-shell particles occurs under higher mixing rates of 4000 rpm (examples 2-3).

Another important observation was that the paste prepared with the core-shell particles, according to examples 1-3, were more accessible to paste and handle due to a reduced plasticity/viscosity. Furthermore, the aging of the positive active mass, which typically results in a change of color and a hardening of the paste, is significantly reduced. The mixing and handling energy required for the pasting process and applying the paste onto the electrode grids could be significantly reduced. This effect can be attributed to using fumed metal oxides for coating the red lead particles. It was observed that using non-fumed metal oxides in the same dry coating process leads to inferior results in terms of paste viscosity.

4. A Plurality of core-shell particles comprising the core-shell particle of claim 1, wherein the plurality of core-shell particles has a tamped density in a range of from 2.3 to 3.0 g/cm$^3$.

5. The core-shell particle of claim 1, wherein the titanium dioxide and/or the aluminum oxide has an average aggregate particle size d50 in a range of from 10 to 150 nm, as determined by TEM analysis.

6. The core-shell particle of claim 1, wherein the titanium dioxide and/or the aluminum oxide is present in a range of from 0.1 to 10 wt. %, based on total core-shell particle weight.

7. The core-shell particle of claim 1, wherein the titanium dioxide and/or the aluminum oxide has a BET surface area in a range of from 5 to 200 m$^2$/g.

8. The core-shell particle of claim 1, comprising tetrabasic lead sulfate (4PbO×PbO$_4$).

9. The core-shell particle of claim 8, comprising:
the tetrabasic lead sulfate in a range of from 0.1 to 10 wt. %, based on by total core-shell particle weight.

10. A process for producing the core-shell particle of claim 1, the process comprising:
dry mixing the red lead and the pyrogenically produced titanium dioxide and/or aluminum oxide.

11. The process of claim 10, wherein the dry mixing is conducted with an electric mixing unit at an electrical power in a range of from 0.05 to 1.5 kW per kg of the red lead.

12. A paste composition suitable for a lead-acid battery, the composition comprising:
the core-shell particle of claim 1.

13. An electrode suitable for a lead-acid battery, the electrode comprising:
the core-shell particle of claim 1.

14. A lead-acid battery, comprising:
the core-shell particle of claim 1.

TABLE 6

Comparison of applying different lead oxide types in charging/discharging tests.

| Example | H$_2$O-porosity, [%] | Hg-porosity, [%] | Hg Intrusion ml/g | Pb$_3$O$_4$ in the paste, wt % | 4BS*, wt % related to Pb$_3$O$_4$ | fumed Al$_2$O$_3$ coating, wt % related to Pb$_3$O$_4$ | rotation speed during mixing with Al$_2$O$_3$, rpm | results (Table) | average mass utilization (#3), g/Ah |
|---|---|---|---|---|---|---|---|---|---|
| Comparative Example 1 | 40.0 | 49.0 | 0.125 | 0 | 0 | 0 | — | 1 | 8.6 |
| Comparative Example 2 | 43.0 | | | 25 | 0 | 0 | — | 2 | 8.3 |
| Example 1 | 43.4 | 50.7 | 0.140 | 25 | 5 | 4 | 500 | 3 | 7.9 |
| Example 2 | 43.3 | 45.3 | 0.130 | 25 | 0 | 4 | 4000 | 4 | 7.5 |
| Example 3 | 43.3 | 52.9 | 0.156 | 25 | 5 | 4 | 4000 | 5 | 7.4 |

*4BS = tetra-basic lead sulfate (4PbO × PbSO$_4$);

The invention claimed is:

1. A core-shell particle, comprising:
a core comprising red lead; and
a shell comprising a pyrogenically produced titanium dioxide and/or a pyrogenically produced aluminum oxide.

2. The core-shell particle of claim 1, wherein the red lead comprises PbO$_2$ in a range of from 25 to 32 wt. %.

3. The core-shell particle of claim 1, having an average particle size d50 of not more than 5 μm.

15. A process of making a lead-acid battery, the method comprising:
combining the core-shell particle of claim 1 with a component of the lead-acid battery.

16. The core-shell particle of claim 1, comprising the titanium dioxide.

17. The core-shell particle of claim 1, comprising the aluminum oxide.

18. The core-shell particle of claim 1, comprising the titanium dioxide and aluminum oxide.

* * * * *